No. 11,968. Reissued Feb. 18, 1902.

E. GREIL & E. AUDIGER.

ELECTRIC CONTACT OR CURRENT TAKING DEVICE.

(Application filed Aug. 9, 1901.)

2 Sheets—Sheet 1.

Witnesses.
Robt Everett.
Dennis Sumby.

Inventors.
Ernest Greil.
Emile Audiger.
By James L. Norris
Atty.

No. 11,968. Reissued Feb. 18, 1902.

E. GREIL & E. AUDIGER.

ELECTRIC CONTACT OR CURRENT TAKING DEVICE.

(Application filed Aug. 9, 1901.)

2 Sheets—Sheet 2.

Witnesses.
Robt Everett.
Dennis Sumby.

Inventors.
Ernest Greil.
Emile Audiger.
By James L. Norris.
Atty.

UNITED STATES PATENT OFFICE.

ERNEST GREIL AND EMILE AUDIGER, OF PARIS, FRANCE, ASSIGNORS, BY MESNE ASSIGNMENTS, TO NATIONAL ELECTRIC IMPROVEMENT COMPANY, OF NEW YORK, N. Y., A CORPORATION OF NEW JERSEY.

ELECTRIC CONTACT OR CURRENT-TAKING DEVICE.

SPECIFICATION forming part of Reissued Letters Patent No. 11,968, dated February 18, 1902.

Original No. 663,750, dated December 11, 1900. Application for reissue filed August 9, 1901. Serial No. 71,527.

DIVISION A.

*To all whom it may concern:*

Be it known that we, ERNEST GREIL and EMILE AUDIGER, citizens of the Republic of France, residing at 138 Faubourg St. Honoré, Paris, France, have invented certain new and useful Improvements in Electric Contacts or Current-Taking Devices, (for which Letters Patent of the United States No. 663,750 were granted to us the 11th day of December, 1900, and which are surrendered for reissue in three divisions or patents,) of which the following is a specification.

This invention relates to electric contact or current-taking devices for electric appliances, more especially those intended for illuminating purposes.

This invention aims to construct a device of the above general character adapted for use in connection with translating appliances—such as lamps, candlesticks, or candelabra—placed upon or secured to a table or other support.

It has heretofore been necessary with the means usually employed for taking the electric current to conduct to the foot of the appliance a small cable or other conducting device, which is frequently the cause of much inconvenience, as it encumbers the piece of furniture or other support upon which the appliance rests and renders these latter liable to be upset.

In accordance with our invention we connect the electric conductor not with the translating device—for example, a lamp, candlestick, or candelabrum—but with the piece of furniture itself, and we place in one or more positions upon such piece of furniture or other support contacts or current-taking devices which possess the advantage of not presenting either a projection or a cavity when arranged in position.

Figure 1:
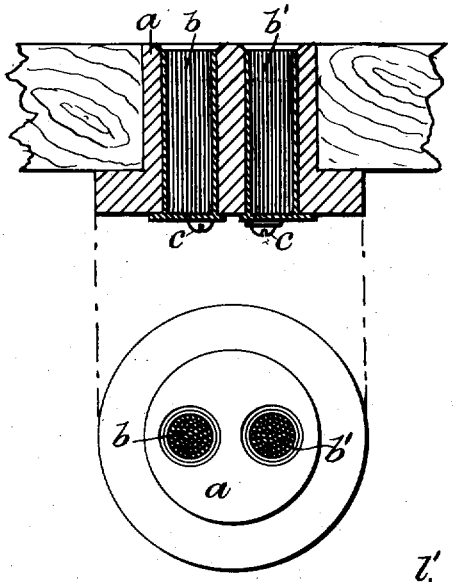
Figure 2:
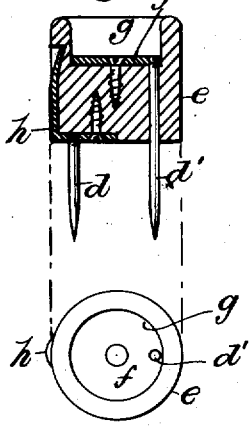
Figure 3:
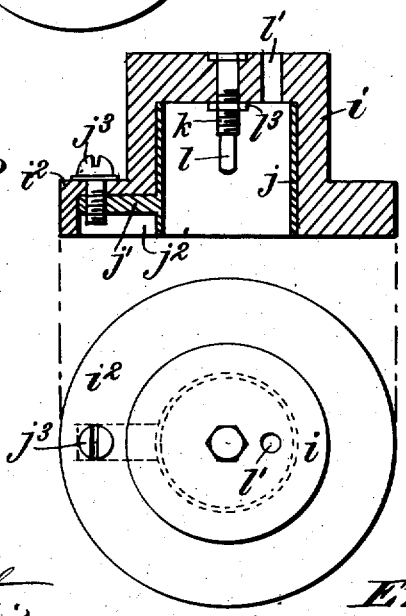
Figure 4:
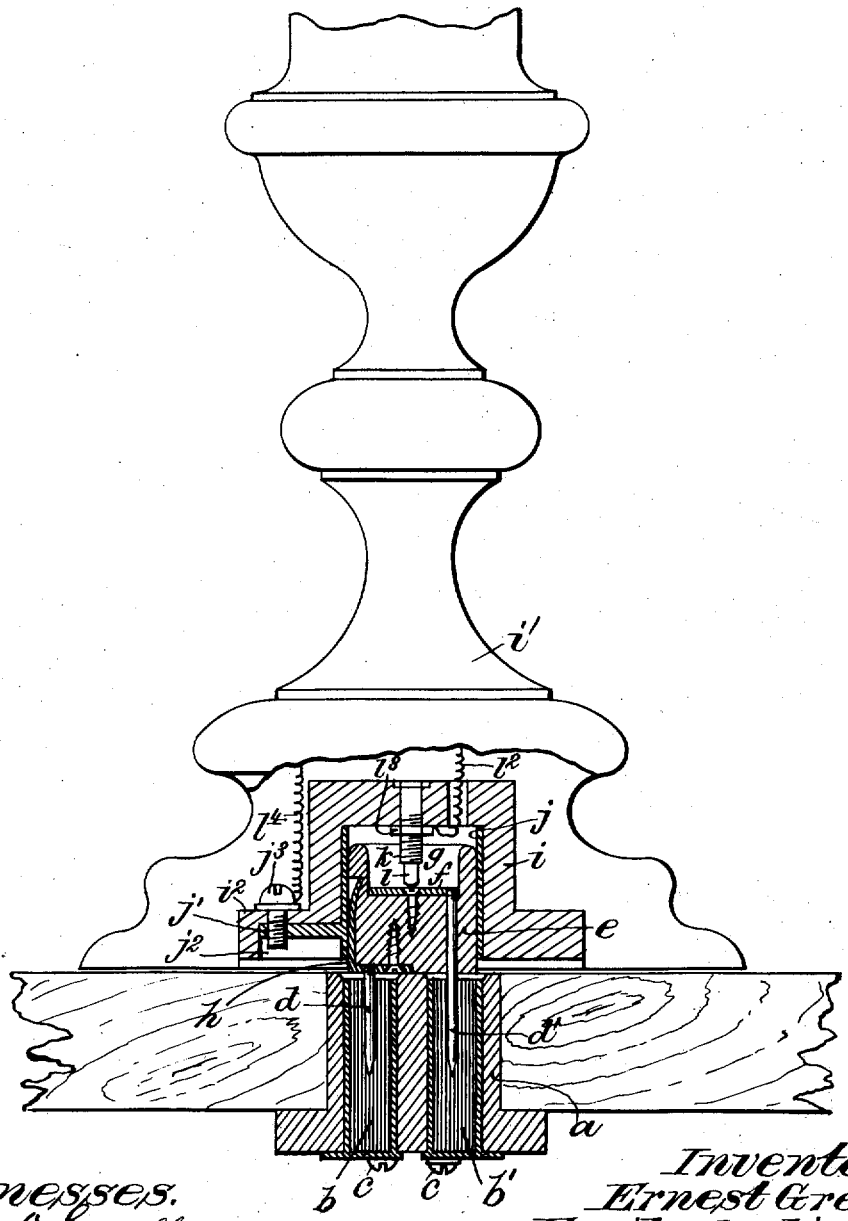

In the drawings forming a part of this specification, Figure 1 represents in cross-section and in plan a portion of a support, as a table, upon which is mounted the fixed part of our device. Fig. 2 shows in section and in external elevation the intermediate connecting-block, which is arranged between the said fixed part and a socket forming a part of the translating device. Fig. 3 represents the socket in plain and in section. Fig. 4 shows a sectional elevation of the various parts when the illuminating device is arranged in operative position.

Referring to the drawings, wherein like letters of reference indicate corresponding parts throughout the several views, *a* indicates a fixed block of insulating material—such as wood, ebonite, or the like—in which are embedded two conducting pieces or masses *b b'*, constituted, in the manner of the brushes employed in electrical apparatus, of a large number of metallic wires arranged in juxtaposition, or these conducting masses may consist of thin metal sheets, lead shot, sheet-tin, plumbago, &c. The block *a* is rigidly attached to the table or other piece of furniture or support and is embedded therein in such manner as to be flush with the upper surface thereof, as are also the conducting pieces or masses *b b'*. These latter are connected at their lower portions at *c c* with electric conductors from a generator by means of flexible wires. The generator and the wires connecting the conducting pieces or masses therewith are not shown, as they are not essential to an understanding of the invention. The block *a* and the conducting masses *b b'* are embedded in the piece of furniture or other support and may be concealed by a cloth or cover placed on the latter.

The reference-letters *d d'* indicate a pair of conducting projections, which are adapted to penetrate or enter the conducting masses *b b'* and while serving to conduct the current to place the translating or other illuminating device in circuit serve also to secure or hold the same firmly in position. The projections *d d'* are rigidly connected to a cylindrical block *e* of insulating material, which we will term a "connecting-block." The projections need not necessarily be fixed to the cylindrical block *e*, but may be adapted directly to the translating appliance. In certain cases this would constitute a simplification of the device. The projection *d'* is in metallic connection with a contact shown as a strip of metal *f*, arranged at the bottom of a cavity $g$, formed in the portion of the connecting-block opposite to that in which the projection is situated, and the other projection $d$ is in metallic connection with a contact consisting of a band of metal $h$, arranged upon the periphery and bottom of the connecting-block $e$. When the connecting-block $e$ is placed upon the fixed block $a$ and the projections $d$ $d'$ engage the masses $b$ $b'$, the connecting-block will project from the table and is adapted to engage with the socket $i$, mounted in the base of the translating device $i'$, and thus connect the latter to the system.

The socket $i$ is provided with a metallic sleeve $j$, which engages the inner face thereof and has formed integral with its periphery an outwardly-extending lug $j'$, arranged to extend into a recess $j^2$, formed in the flanged portion $i^2$ of the socket $i$ and is connected to the said flange $i^2$ by the binding-post $j^3$. The top of the socket $i$ has extending therethrough a hollow plug $k$, which projects within the socket and has operating therein a spring-actuated pin $l$. The top of the socket $i$ is provided with an opening $l'$, through which extends the leading-in wire $l^2$ of the illuminating device $i'$, which is adapted to be connected to the plug $k$ by means of the nut $l^3$. The other leading-in wire $l^1$ of the translating device is connected to the binding-post $j^3$.

When it is desired to render the apparatus operative, the cylindrical connecting-block $e$ is placed upon the fixed insulating-block $a$, the projections $d$ $d'$ engaging the metallic masses $b$ $b'$. Then upon the cylindrical connecting-block $e$ is mounted the socket $i$ of the base of the translating device. The current passes, on the one hand, for example, from the mass $b$ to the projection $d$, and thence to band $h$ and sleeve $j$, lug $j'$, and thence to the translating device, and, returning, from the illuminating device to the hollow plug $k$, pin $l$, metallic strip $f$, projection $d'$, and mass $b'$, thus completing the circuit; or it may take the other path from the mass $b'$ through the illuminating device and back to the mass $b$. This method entirely obviates the necessity for the presence of conducting-wires upon the furniture or other support, and to all appearances the illuminating appliance is merely rested thereon.

Of course several conducting masses $b$ $b'$ and fixed blocks $u$ may be provided upon the same piece of furniture or other support for the purpose of enabling several translating appliances to be arranged thereon or to enable the position of the said appliances to be changed at will.

Having thus described our invention, what we claim as new, and desire to secure by Letters Patent, is—

1. The combination with a plurality of electric conducting masses adapted to be connected respectively with the positive and negative poles of a generator and mounted in a table or other suitable support, of a connecting-block having conducting projections thereon adapted to penetrate the said masses, contacts connected respectively to said projections and mounted on separate portions of said block, a socket in the base of a translating device adapted to receive said block, and contacts on said socket-piece adapted to engage the contacts of the connecting-block and suitably connected to the conductors leading to said translating device.

2. The combination of a plurality of electric conducting masses adapted to be connected respectively with the positive and negative poles of an electric generator and mounted in a table or other suitable support, of an insulating connecting-block having conducting projections thereon adapted to penetrate said masses, contact devices, one embracing said block and the other seated in a recess in the upper end thereof, a socket in the base of a translating device adapted to receive said block, a sleeve in said socket connected with one of the conductors leading to said translating device and adapted to engage the contact device embracing said block, and a yieldingly-mounted contact on said socket, connected with the other conductor leading to said translating device and adapted to engage the contact device seated in the recess in said block.

3. The combination of a support having penetrable electric conductors, an external cylindric insulating-block having two conducting projections extending below its under side, one adapted to enter each of said penetrable conductors, and also having upon its exterior two separate electrical contacts in communication with said projections, and an internal cylindric part adapted to fit snugly around and so engage firmly with said externally-cylindric block and having internal conductors for engaging with the external conductors of said block.

In testimony whereof we have signed our names to this specification in the presence of two subscribing witnesses.

ERNEST GREIL.
EMILE AUDIGER.

Witnesses:
EDWARD P. MACLEAN,
ANDRÉ LÉVY PICARD.